United States Patent
Araki et al.

[11] Patent Number: 6,085,878
[45] Date of Patent: Jul. 11, 2000

[54] IMPACT ABSORBER MADE OF RESIN

[75] Inventors: Yoshio Araki; Sakashi Kamata; Yujiro Matsuyama; Kiyoshi Negishi; Chisato Nonomura, all of Ohtsu, Japan

[73] Assignee: Toyo Boseki Kabushiki Kaisha, Osaka, Japan

[21] Appl. No.: 09/117,978

[22] PCT Filed: Dec. 12, 1997

[86] PCT No.: PCT/JP97/04596

§ 371 Date: Nov. 12, 1998

§ 102(e) Date: Nov. 12, 1998

[87] PCT Pub. No.: WO98/26195

PCT Pub. Date: Jun. 18, 1998

[51] Int. Cl.[7] ............................................. F16F 7/12
[52] U.S. Cl. ........................... 188/377; 188/371; 188/376
[58] Field of Search ................................... 188/371–377; 74/492; 280/777; 293/133; 267/136, 153, 141, 140

[56] References Cited

U.S. PATENT DOCUMENTS 5,746,419  5/1998  McFadden et al. ....................... 188/377

FOREIGN PATENT DOCUMENTS

| 57-51154 | 11/1982 | Japan . |
| 63-3177 | 1/1988 | Japan . |
| 7-269622 | 10/1995 | Japan . |
| 8-170674 | 7/1996 | Japan . |

*Primary Examiner*—Douglas C. Butler
*Attorney, Agent, or Firm*—Morrison & Foerster LLP

[57] ABSTRACT

A resin impact absorber comprising a hollow columnar body having a honeycomb section or a hollow columnar body having a cylindrical shape, the hollow columnar body being made of a resin with a flexural modulus of 500 to 5000 $kgf/cm^2$, wherein a reaction-compressibility curve at the time of compression in the lengthwise direction of the columnar body satisfies the following conditions: (a) yield strength $\geq 100$ $Tf/m^2$ and (b) compression energy absorption $\geq 50$ $Tf.m/m^3$. The resin impact absorber of the present invention is small in size and light in weight and exhibits a high impact energy absorption capacity. A site or structure with an impact absorber of the present invention disposed therein can be prevented from remarkable damage or breakage when it receives a high impact force.

7 Claims, 3 Drawing Sheets

IMPACT ABSORBER MADE OF RESIN

TECHNICAL FIELD

The present invention relates to a resin impact absorber which can be applied to sections requiring the absorption or attenuation of an impact, for example, side walls of roads or wharves, floors or walls of buildings, and impact-attenuating portions of vehicles.

BACKGROUND ART

The conventional impact-absorbing means may include metal springs, friction-type attenuators, hydraulic attenuators, and molded rubber parts. In some cases, these means may be used in any combination. The metal springs, although they have excellent attenuation performance, exhibit almost no impact energy absorption capacity. The friction-type attenuators and hydraulic attenuators are usually complex in structure, and they have a problem that their spring constants have extremely great dependence upon the rate of deformation and these attenuators, therefore, have no restoration.

The molded rubber parts are characterized by their good restoration, but on the other hand, they have a drawback that the material should be used in larger amounts for securing satisfactory impact absorption because of having a low elastic modulus and the member, therefore, has an increased weight and becomes large in size.

As the impact-absorbing means with shaped resin parts, the present inventors have proposed an impact absorber comprising a shaped resin part with cushioning properties, which is provided with two or more arched, domed, or other shaped compression-deformable portions on a perforated or unperforated flat board. The impact absorber, however, has problems that it exhibits small impact energy absorption and it is difficult of application in the case where it should be disposed in a limited space.

As the impact absorber with shaped resin parts, there is disclosed a technique for the production of shaped resin parts, characterized in that hollow shaped parts made of a thermoplastic elastomer are given permanent strain by compression in the axial direction (see Japanese Patent Publication No. 61-12779). The shaped resin parts obtained by this technique, although they have excellent attenuation performance, have a problem that they only exhibit a poor collision energy absorption capacity.

DISCLOSURE OF INVENTION

The present invention has been completed by taking into account the problems of the conventional impact-absorbing means as described above, and the purpose of the present invention is to provide resin impact absorbers with an excellent energy absorption capacity, characterized in that they are small in size and light in weight, and further simple in structure, and they exhibit larger energy absorption as compared with the reaction, and they have rustproofness, water resistance, and weatherability, so that they can be used, free of maintenance, in all places, i.e., on the ground and in the sea.

The resin impact absorbers of the present invention, which can solve the above problems, are as follows:

(1) A resin impact absorber characterized in that it comprises a shaped part having a hollow portion, and the shaped part is made of a resin with a flexural modulus of 500 to 5000 kgf/cm$^2$ and is designed so that it can absorb impact energy by buckling deformation thereof when it receives the impact energy in the lengthwise direction thereof and the following conditions (a) and (b) can be satisfied in the reaction-compressibility curve at the time of compression in the lengthwise direction of the shaped part:

(a) yield strength is 100 Tf/m$^2$ or higher; and (b) compression energy absorption is 50 Tf.m/m$^3$ or higher.

The embodiments of the present invention may include the following examples.

(2) The resin impact absorber according to the above item (1), characterized in that the shaped part has a cavity portion divided with cell walls, the cavity portion being formed of many penetrating holes interconnecting and opening in the same direction, and the shaped part has a honeycomb section and is designed so that it can absorb the impact energy by buckling deformation of the cell walls in the cavity portion.

(3) The resin impact absorber according to the above item (1), characterized in that the shaped part is a hollow cylindrical body and is designed so that it can absorb the impact energy by buckling deformation of the hollow cylindrical body.

(4) The resin impact absorber according to the above item (3), wherein (a) yield strength is 1000 Tf/m$^2$ or higher and (b) compression energy absorption per unit volume is 200 Tf.m/m$^3$ or higher.

(5) The resin impact absorber according to the above item (4), wherein the shaped part is a hollow cylindrical body and is designed so that it can absorb the impact energy by buckling deformation of a large-deformable portion of the hollow cylindrical body.

(6) The resin impact absorber according to any of the above items (2) to (4), wherein the displacement occurring over the compression region is always positive in the reaction-compressibility curve.

(7) The resin impact absorber according to the above item (2), wherein the shaped part is provided with a stepped portion at the end of each cell wall so that the reaction can be distributed uniformly.

The above honeycomb section refers to those having many penetrating holes, for example, in a honeycomb or lattice pattern, and the stepped portions partly provided at the ends of cell walls in a shaped part having a honeycomb section are preferred because they can attain the uniform distribution of reaction occurring against the reaction impressed on the section and they can, therefore, make the impact-attenuating effects more excellent.

The resin impact absorber of the present invention should be used so that it can absorb impact energy by deformation under compression (i.e., buckling deformation of cell walls in the cavity portion) in the lengthwise (i.e., axial) direction. The resin impact absorber of the present invention is made of a resin with a flexural modulus of 500 to 5000 kgf/cm$^2$. Examples of the resin with a flexural modulus of 500 to 5000 kgf/cm$^2$ are thermoplastic polyester elastomers, polyolefin elastomers, polyurethane elastomers, polyamide elastomers, including their blends, and thermosetting resins such as polyurethane resins for use in the casting. Particularly preferred among these resins are elastic resins such as thermoplastic polyester elastomers, polyolefin elastomers, and polyamide elastomers because of their excellent weatherability and water resistance; however, there is no limitation on the kind thereof, so long as the flexural modulus falls within the above specified range.

By the way, in the case of a resin with a flexural modulus of lower than 500 kgf/cm$^2$, the impact absorber obtained has an insufficient spring constant, so that the components should have an increased wall thickness for attaining satisfactory energy absorption performance and the impact absorber, therefore, becomes large in size and heavy in weight, resulting in a departure from the purpose of the present invention.

On the other hand, in the case of a resin with a flexural modulus of higher than 5000 kgf/cm$^2$, the impact absorber obtained becomes too stiff and has insufficient flexibility, so that it easily causes a rupture during the buckling deformation of cell walls in the cavity portion when it receives an impact force, resulting in a failure to achieve the purpose of the present invention.

In contrast to these cases, the use of a resin with a flexural modulus of 500 to 5000 kgf/cm$^2$ makes it possible to advance the initial rise of reaction or to increase the yield reaction of an impact absorber, if necessary, so that the impact absorber can be small in size and light in weight without having such an extremely increased wall thickness as in the conventional molded rubber parts and it does not easily cause breakage when compressed. The flexural modulus is preferably in the range of 500 to 3500 kgf/cm$^2$, more preferably 900 to 2000 kgf/cm$^2$.

BRIEF DESCRIPTION OF THE DRAWINGS

The impact absorber having a hollow portion of the present invention is formed into a shape and structure as described below in detail with a resin satisfying the above requirement on the flexural modulus, and is designed so that it can absorb an impact on the whole. That is.

In the impact absorber with a structure as shown in the figure, i.e., impact absorber having penetrating holes with a honeycomb section, cavity portion 2 surrounded by cell wall 1 causes buckling deformation of the cell wall and cavity portion against the impact load in the lengthwise direction of the impact absorber, so that the impact absorber can absorb impact energy. The shape and size in section of the resin impact absorber are determined in accordance with the demand, but there is no limitation on the configuration of penetrating holes, which can, therefore, be made into various configurations, for example, polygonal ranging from triangular to octagonal, circular, or inequilateral.

In the case where the impact absorbers of the present invention are put to practical use, the number of these impact absorbers to be disposed can suitably be determined depending upon the degree of impact absorption that is required for the application site. For attaining the purpose of the present invention, it is necessary to achieve the conditions that the yield (plateau) strength is 100 Tf/m$^2$ or higher as determined by the reaction-compressibility curve, which is obtained when the impact absorber is compressed in the direction of an arrow (i.e., lengthwise direction) shown in FIG. 1, and that the compression energy absorption is 50 Tf.m/m$^2$ or higher.

Figure 1:
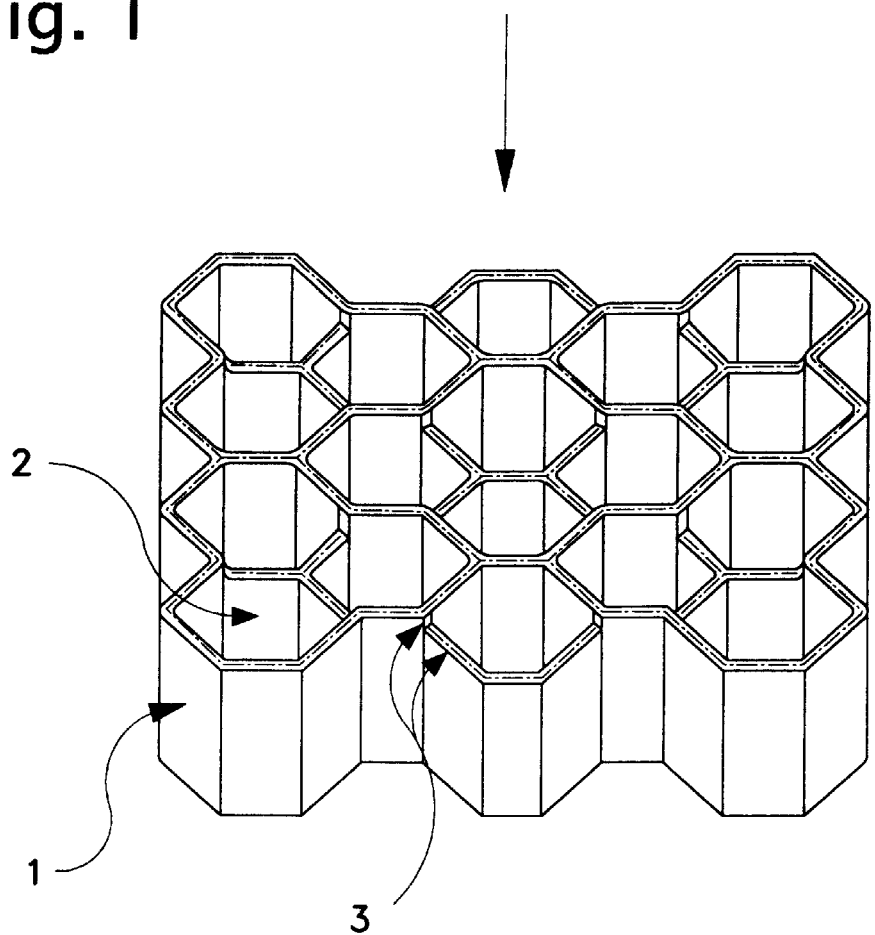
FIG. 1 illustrates an example of the structure of an impact absorber according to the present invention, which is a resin impact absorber formed into one piece from a resin with a flexural modulus of 500 to 5000 kgf/cm$^2$ and provided with more than one cavity portion 2, i.e., many penetrating holes, having a hexagonal section surrounded by cell wall 1, and interconnecting and opening in the same direction.

The reaction-compressibility curve (hereinafter referred to as the S-S curve in some cases) refers to a graph showing the correlation between the reaction (i.e., compressive force per impact-receiving area), for example, when a resin impact absorber is compressed in the impact-applying direction (i.e., impact-loading direction), and the compressibility. In the initial stage of compression, the S-S curve steeply rises approximately in proportion to the compressibility and then gradually exhibits a gentle slope, reaching the yield point showing the maximum reaction in a local area. At this point, the resin impact absorber causes a yield in the cavity portion, and after the cavity portion begins to cause buckling deformation, the reaction is kept at a constant level (i.e., flat region) regardless of an increase in compressibility (this region may also be called "plateau") until the S-S curve steeply rises again with a reduced void. Furthermore, the cell wall portions of a resin impact absorber are preferably formed into a shape with stepped portions as shown in FIG. 1 by partly cutting the ends of the cell walls because the yield reaction can be decreased and adjusted to an approximately constant level, which is the same as that of the reaction in the flat region, and the reaction occurring against the reaction impressed on the honeycomb plane can be distributed uniformly.

Figure 2:
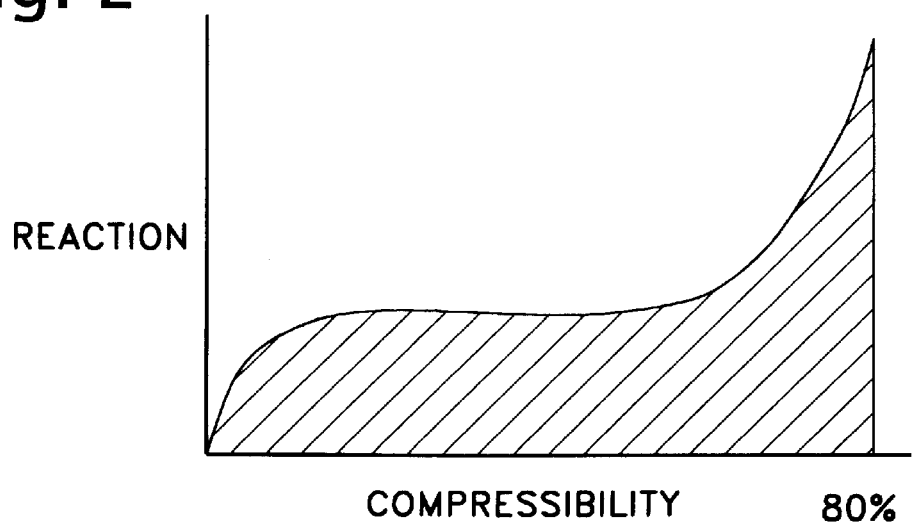

The yield (plateau) strength in the S-S curve as used herein refers to the value of reaction showing the maximum in the flat region (i.e., plateau) after the initial rise. The compression energy absorption refers to the quotient obtained by dividing the absorption energy which is represented by the area (i.e., hatched area in FIG. 2) under the S-S curve up to the compressibility of 80% (or to the final steeply rising region when an impact absorber is capable of being compressed only up to the compressibility of lower than 80%) by the volume of the shock absorber.

The yield strength as used herein does not always correspond to the maximum value of reaction in the S-S curve of an impact absorber; however, it is a value closely corresponding to the maximum reaction applied to the impact body when the shock absorber receives an impact force, and it serves as the standard for the maximum value of reaction. If the yield strength is insufficient, the function as an impact energy absorber cannot be substantially exhibited. On the other hand, if the yield strength is too high, the reaction occurring at the time of impact is increased, so that the impact cannot be satisfactorily attenuated. For absorbing impact energy with high efficiency, it is effective to make the initial rise in the S-S curve as steeply as possible and further make the decrease in reaction after the yield point as small as possible.

From this point of view, various physical properties required for the resin impact absorbers of the present invention have been studied. As the result, for sufficiently attenuating an impact force without giving excessive reaction against the impact force, the resin impact absorbers should have a yield strength of 100 Tf/m$^2$ or higher and a compression energy absorption of 50 Tf.m/m$^3$ or higher, preferably a yield strength of 150 Tf/m$^2$ or higher and a compression energy absorption of 200 Tf.m/m$^3$. The resin impact absorbers of the present invention can fully satisfy these characteristics required.

Figure 3:
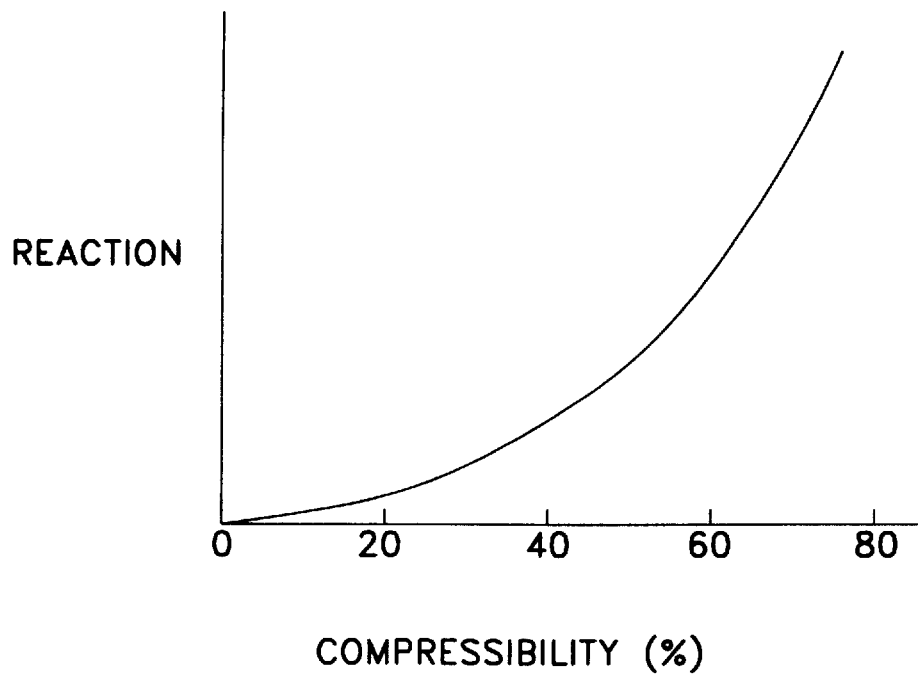

By the way, in the case of conventional impact absorbers such as molded rubber parts known in the past, the rise in the S-S curve is slow as shown in FIG. 3. Therefore, for securing satisfactory impact absorption, the amount of material to be used should be increased, so that the member necessarily becomes heavy in weight and large in size.

Figure 4:
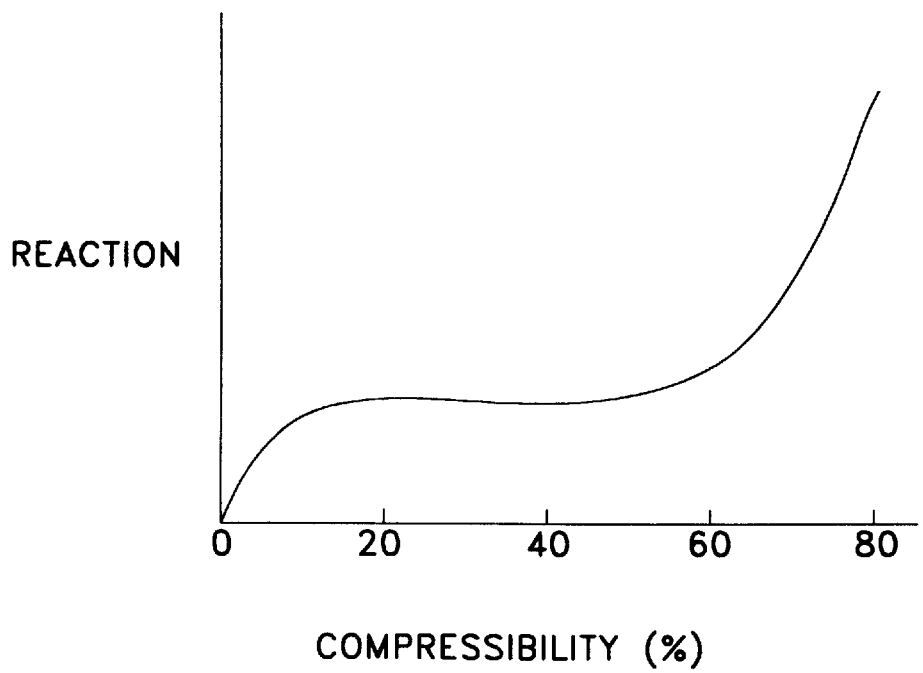

In contrast, the resin impact absorbers of the present invention with a specified flexural modulus for the resin as well as a shape and structure designed as described above exhibit, as schematically shown in FIG. 4, both the steep initial rise in the S-S curve and the moderate yield strength, and then exhibit the approximately constant reaction for a while even if the compressibility is changed any more, and then exhibit the steep final rise in the S-S curve, resulting in an impact absorber capable of absorbing very high compression energy of 50 Tf.m/m³ or higher.

For securing a compression energy absorption of 200 Tf.m/m³ or higher and further a yield strength of 1000 Tf/m², an impact absorber is preferably formed into a hollow cylindrical shape and designed so that it can absorb an impact as the whole shaped part. That is, as shown in FIGS. 5 and 6 illustrating the structure of this impact absorber, flat board portions (flange) 5 are provided at both ends of hollow cylindrical large-deformable portion 4, in which penetrating holes 6 are pierced, if necessary, for attachment to another structure.

In the impact absorber with a structure as shown in the figures, flat board portions 5 serve as the impact force-receiving planes, and on the other hand, large-deformable portion 4 serves as the elastically deformable portion and buckling deformable portion for attenuation or absorption of the impact force. There is no limitation on their shapes, so long as they are hollow cylindrical, and they can be formed into various shapes and structures.

If necessary, the hollow cylindrical large-deformable portion may be changed in shape, so that the rise in reaction can be advanced or the yield reaction can be increased. Furthermore, in the case of a hollow cylindrical body, the impact-attenuating effects can be made further excellent by such a design that the large-deformable portion can cause a yield in the process of compression and the displacement of reaction occurring over the compression region can always be positive.

Figure 5:
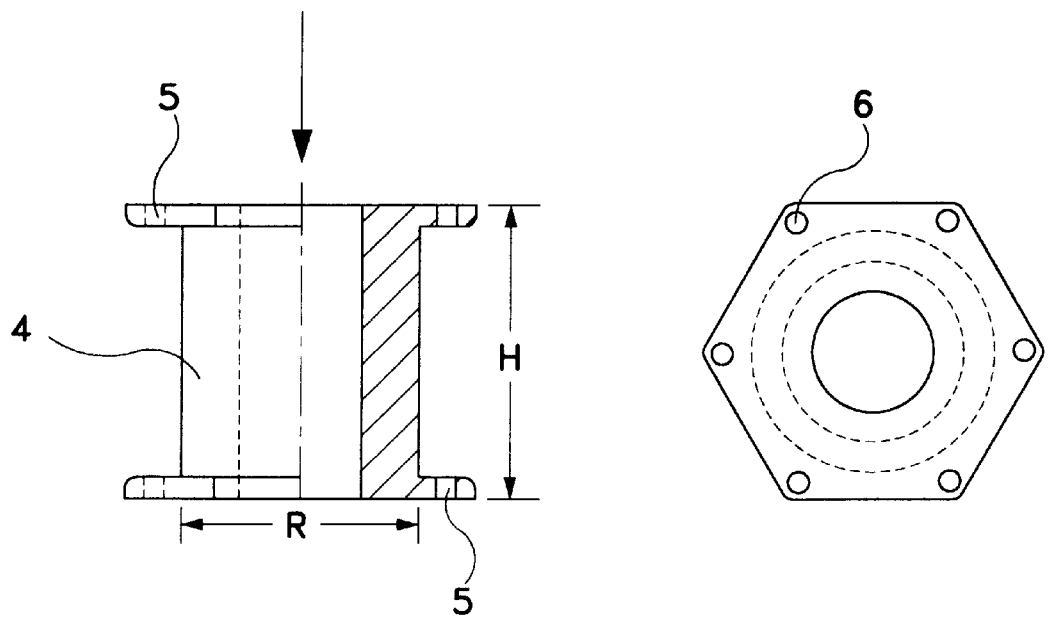
Figure 6:
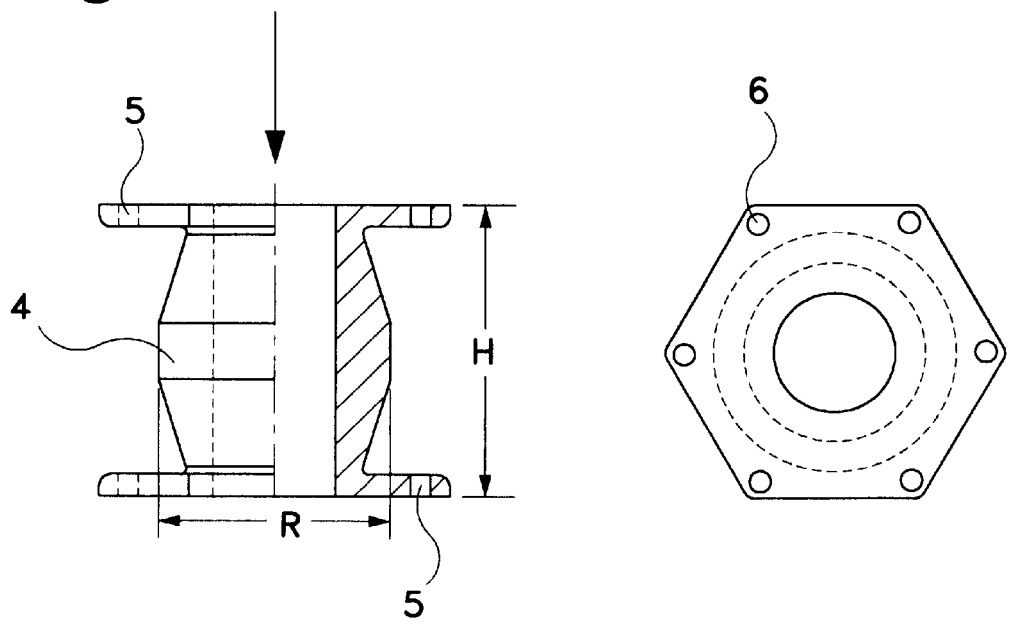

In addition, the number of the above impact absorbers to be disposed can suitably be determined depending upon the degree of impact absorption that is required for the application site; however, it is necessary to achieve the conditions that the yield strength is 1000 Tf/m² or higher as determined by the reaction-compressibility curve, which is obtained when the impact absorber is compressed in the direction of an arrow (i.e., lengthwise direction of the shaped part) shown in FIGS. 5 and 6, and that the compression energy absorption per unit volume of the impact absorber is 200 Tf.m/m² or higher.

The shape, structure, and wall thickness of the hollow cylindrical large-deformable portion are not particularly limited; however, they may suitably be changed depending upon the use or purpose as described above. For securing the above yield strength and compression energy absorption, the shape is preferably determined in such a manner that the ratio of height H to outer diameter R of the large-deformable portion, i.e., R/H, is in the range of 0.3 to 1.5. The reason for this is as follows: if R/H is lower than 0.3, the large-deformable portion has an insufficient height, so that the energy absorption by buckling deformation is decreased; and on the other hand, if R/H is higher than 1.5, the large-deformable portion has a tendency to fall sideways in an unpredictable direction.

The impact absorbers of the present invention are given a quasi dashpot and spring-like energy-absorbing behavior, as described above, by a combination of their shape and the viscoelastic properties of a resin with a moderate flexural modulus, so that they can absorb impact energy with extremely high efficiency and they can, therefore, prevent the damage of structures, which will be caused by the impact energy.

As the process of producing the resin impact absorbers of the present invention, any method can be adopted, including injection molding, extrusion, or press molding.

For the resin impact absorbers of the present invention, any ordinary method for attachment can be adopted, for example, a method in which the impact absorber is attached to another structure though the holes provided on the flat board portions thereof; however, there is, of course, no limitation on the method for attachment.

The preferred kinds of resins, which can be used in the present invention, are as described above. These resins may be modified, depending upon the use or purpose, for example, by the addition of various stabilizers such as thermal antioxidants and ultraviolet light absorbers; fillers such as dyes, carbon black, talc, and glass beads; fiber reinforcing agents such as metal fibers, glass fibers, and carbon fibers; and additives such as antistatic agents, plasticizers, flame retarders, foaming agents, and release agents.

The present invention is thus constructed, and it becomes possible to provide, by the use of a resin with a specified flexural modulus and by the design of a specified shape and structure, an impact absorber with excellent impact-absorbing characteristics by the elastic properties of the resin and the buckling deformation of the shaped part, which impact absorber exhibits a high impact energy absorption capacity, although it is small in size and light in weight. The impact absorber can be widely applied, by making use of its excellent characteristics, to various sites requiring the impact-attenuating properties, such as side walls of roads or wharves, floors or walls of buildings, and vehicles.

BEST MODE FOR CARRYING OUT THE INVENTION

The present invention will be further illustrated by the following examples and comparative examples; however, the present invention is, of course, not limited to the following examples, and any changes, variations, and modifications adaptable to the above-described purpose fall within the technical scope of the present invention.

EXAMPLE 1

An impact absorber (wall thickness t=4.3 mm; length of one side l=25 mm; and height H=100 mm) having penetrating holes with a hexagonal section as shown in FIG. 1 was injection molded with polyester elastomer "PELPRENE P-90B" available from Toyo Boseki K.K. (total size: width W=500 mm×depth D=200 mm). This impact absorber was compressed in the lengthwise direction by the following evaluation method. The results of the evaluation are shown in Table 1.

EXAMPLE 2

An impact absorber (wall thickness t=4.3 mm; length of one side l=25 mm; and height H=100 mm) having penetrating holes with a hexagonal section as shown in FIG. 1 was injection molded with polyester elastomer "PELPRENE P-70B" available from Toyo Boseki K.K. (total size: width W=500 mm×depth D=200 mm). This impact absorber was compressed in the lengthwise direction by the following evaluation method. The results of the evaluation are shown in Table 1.

Comparative Example 1

An impact absorber of 21 cm×21 cm×height 3.3 cm provided with eight arched large-deformable portions was injection molded with polyester elastomer "PELPRENE P-280B" available from Toyo Boseki K.K. This impact absorber was capable of being compressed substantially up to 80% in the height direction. Furthermore, many absorbers of this type were joined together in the depth and widthwise directions and in the height direction with resin rivets to give an assembled impact absorber of 101 cm×101 cm×99 cm. This impact absorber was compressed in the height direction. The results of the evaluation are shown in Table 1.

EXAMPLE 3

A hollow cylindrical impact absorber (height of large-deformable portion H=10 cm×outer diameter of cylindrical portion R=8 cm) as shown in FIG. 5 was injection molded with polyester elastomer "PELPRENE P-55B" available from Toyo Boseki K.K. This impact absorber was capable of being compressed substantially up to 80% when compressed in the lengthwise (i.e., height) direction by the following evaluation method. The results of the evaluation are shown in Table 2.

EXAMPLE 4

A hollow cylindrical impact absorber (height of large-deformable portion H=20 cm×outer diameter of cylindrical portion R=16 cm) as shown in FIG. 6 was injection molded with polyester elastomer "PELPRENE P-90B" available from Toyo Boseki K.K. This impact absorber was capable of being compressed substantially up to 80% when compressed in the lengthwise (i.e., height) direction by the following evaluation method. The results of the evaluation are shown in Table 2.

Evaluation Method

Flexural modulus of resin: this was measured by the procedure of ASTM-D790 commonly used.

Yield strength: this refers to the strength per unit area of an impact force-receiving plane at the maximum reaction (in the flat region) in the reaction-compressibility curve when an impact absorber is compressed at a constant rate of 50 mm/min., the curve rising approximately in proportion to the compressibility at the initial stage of compression and then gradually exhibiting a gentle slope.

Compression energy absorption: this refers to the energy absorption per unit volume of an impact absorber when it is compressed up to the compressibility of 80% in the reaction-compressibility curve. If an impact absorber cannot be compressed over the compressibility of 80%, this refers to the energy absorption as far as the steeply rising region after the flat region.

Area of impact force-receiving plane: this refers to the contact area of a flat board at the end of a large-deformable portion.

TABLE 1

|  | Example 1 | Example 2 | Comparative Example 1 |
| --- | --- | --- | --- |
| Resin material | P-90B | P-70B | P-280B |
| W (mm) | 500 | 500 | 210 |
| D (mm) | 200 | 200 | 210 |
| H (mm) | 100 | 100 | 33 |
| Impact-receiving area (m$^2$) | 0.05 | 0.05 | 1.00 |
| Weight of shaped part (kg) | 3.0 | 3.0 | 130 |
| Flexural modulus of resin (kgf/cm$^2$) | 1650 | 1100 | 5040 |

TABLE 1-continued

|  | Example 1 | Example 2 | Comparative Example 1 |
| --- | --- | --- | --- |
| Yield strength (Tf/m$^2$) | 350 | 200 | 7 |
| Compression energy absorption (Tf · m/m$^3$) | 540 | 300 | 3.8 |

TABLE 2

|  | Example 3 | Example 4 |
| --- | --- | --- |
| Resin material | P-55B | P-90B |
| H (cm) | 10 | 20 |
| R (cm) | 8 | 16 |
| Weight of shaped part (kg) | 0.5 | 3.0 |
| Area of impact force-receiving plane (m$^2$) | 2.5 × 10$^{-3}$ | 1.0 × 10$^{-2}$ |
| Flexural modulus of resin (kgf/cm$^2$) | 770 | 1650 |
| Yield strength (Tf/m$^2$) | 2000 | 4000 |
| Compression energy absorption per unit volume (Tf · m/m$^3$) | 400 | 1500 |

As can be seen from Tables 1 and 2, the impact absorbers of the present invention can absorb larger impact energy as compared with the conventional impact absorber, and they are, therefore, effective in preventing the damage of colliding bodies and structures.

In addition, these impact absorbers can be used without any trouble even in the air or in the sea, and they are further excellent in rustproofness, water resistance, and weatherability, so that they are free of maintenance.

Industrial Applicability

The resin impact absorbers of the present invention are applied to various sections requiring the absorption or attenuation of an impact, for example, sites requiring the impact-attenuating properties, such as side walls of roads or wharves, floors or walls of buildings, and vehicles, so that a body or structure with an impact absorber disposed therein can be prevented from remarkable damage or breakage when it receives an impact.

We claim:

1. A resin impact absorber characterized in that it comprises a shaped part having a hollow portion, and the shaped part is made of a resin with a flexural modulus of 500 to 5000 kgf/cm$^2$ and is designed so that it can absorb impact energy by buckling deformation thereof when it receives the impact energy in the lengthwise direction thereof and the following conditions (a) and (b) can be satisfied in the reaction-compressibility curve at the time of compression in the lengthwise direction of the shaped part:

(a) yield strength is 100 Tf/m$^2$ or higher; and (b) compression energy absorption is 50 Tf.m/m$^3$ or higher.

2. The resin impact absorber according to claim 1, characterized in that the shaped part has a cavity portion divided with cell walls, the cavity portion being formed of many penetrating holes interconnecting and opening in the same direction, and the shaped part has a honeycomb section and is designed so that it can absorb the impact energy by buckling deformation of the cell walls in the cavity portion.

3. The resin impact absorber according to claim 1, characterized in that the shaped part is a hollow cylindrical body and is designed so that it can absorb the impact energy by buckling deformation of the hollow cylindrical body.

4. The resin impact absorber according to claim 3, wherein (a) yield strength is 1000 $Tf/m^2$ or higher and (b) compression energy per unit volume is 200 $Tf.m/m^3$ or higher.

5. The resin impact absorber according to claim 4, wherein the shaped part is a hollow cylindrical body and is designed so that it can absorb the impact energy by buckling deformation of a large-deformable portion of the hollow cylindrical body.

6. The resin impact absorber according to any of claims 2 to 4, wherein the displacement occurring over the compression region is always positive in the reaction-compressibility curve.

7. The resin impact absorber according to claim 2, wherein the shaped part is provided with a stepped portion at the end of each cell wall so that the reaction can be distributed uniformly.

* * * * *

UNITED STATES PATENT AND TRADEMARK OFFICE

CERTIFICATE OF CORRECTION

PATENT NO. : 6,085,878

ISSUED : July 11, 2000

INVENTOR(S) : Yoshio ARAKI et al.

It is certified that error appears in the above-identified patent and that said Letters Patent is hereby corrected as shown below:

On the title page, item:

[30] Foreign Application Priority Data
Insert --Dec. 13, 1996    [JP]    Japan    8-333875
        Dec. 13, 1996      [JP]    Japan    8-333877--.

Signed and Sealed this

Eighth Day of May, 2001

Attest:

NICHOLAS P. GODICI

Attesting Officer    Acting Director of the United States Patent and Trademark Office